(12) United States Patent
Tarr

(10) Patent No.: US 11,852,259 B2
(45) Date of Patent: Dec. 26, 2023

(54) PROPORTIONAL SOLENOID VALVE HAVING ZERO CURRENT DURING INTERMITTENT STATE HOLD CONDITIONS

(71) Applicant: RESTEK CORPORATION, Bellefonte, PA (US)

(72) Inventor: Brandon Tarr, State College, PA (US)

(73) Assignee: RESTEK CORPORATION, Bellefonte, PA (US)

(*) Notice: Subject to any disclaimer, the term of this patent is extended or adjusted under 35 U.S.C. 154(b) by 72 days.

(21) Appl. No.: 17/434,168

(22) PCT Filed: Feb. 28, 2020

(86) PCT No.: PCT/US2020/020318
§ 371 (c)(1),
(2) Date: Aug. 26, 2021

(87) PCT Pub. No.: WO2020/176837
PCT Pub. Date: Sep. 3, 2020

(65) Prior Publication Data
US 2022/0146012 A1 May 12, 2022

Related U.S. Application Data
(60) Provisional application No. 62/811,958, filed on Feb. 28, 2019.

(51) Int. Cl.
*F16K 31/06* (2006.01)
*F16K 31/524* (2006.01)
*F16K 35/16* (2006.01)

(52) U.S. Cl.
CPC .... *F16K 31/0668* (2013.01); *F16K 31/52475* (2013.01); *F16K 35/16* (2013.01)

(58) Field of Classification Search
CPC ...... F16K 35/16; F16K 35/04; F16K 31/0668; F16K 31/52475
See application file for complete search history.

(56) References Cited

U.S. PATENT DOCUMENTS

| | | | | |
|---|---|---|---|---|
| 775,054 A | * | 11/1904 | Waterman | F16K 31/0679 251/70 |
| 959,609 A | | 5/1910 | Roehrich | |
| 1,434,637 A | * | 11/1922 | Tuck | F16K 31/0679 251/129.1 |
| 1,787,212 A | * | 12/1930 | Rickenberg | F16K 31/06 251/70 |

(Continued)

FOREIGN PATENT DOCUMENTS

| | | |
|---|---|---|
| EP | 2884190 A1 | 6/2015 |
| JP | 58195172 U | 12/1983 |
| WO | 2018219530 A1 | 12/2018 |

*Primary Examiner* — Umashankar Venkatesan
(74) *Attorney, Agent, or Firm* — McNees Wallace & Nurick LLC

(57) ABSTRACT

A proportional solenoid, capable of linear motion, includes an electromagnetic valve device including a solenoid assembly having a mobile core, a push rod connecting the solenoid mobile core to a valve plunger, and a device operable to apply a controlled friction force to hold the mobile core in an intermediate position. The friction force applied by the friction device is greater than the motive forces generated by the solenoid.

18 Claims, 15 Drawing Sheets

(56) References Cited

U.S. PATENT DOCUMENTS

| | | | | |
|---|---|---|---|---|
| 3,582,039 | A | 6/1971 | Cagle | |
| 4,494,727 | A * | 1/1985 | Babitzka | F16K 35/16 |
| | | | | 251/64 |
| 5,772,179 | A * | 6/1998 | Morinigo | F16K 31/0682 |
| | | | | 123/90.11 |
| 5,810,255 | A * | 9/1998 | Itoh | F02M 61/18 |
| | | | | 239/584 |
| 6,267,351 | B1 | 7/2001 | Schneider | |
| 9,322,484 | B2 * | 4/2016 | Becker | F16K 31/56 |
| 9,791,063 | B2 * | 10/2017 | Querejeta Andueza | |
| | | | | G05D 7/0635 |
| 10,677,374 | B2 * | 6/2020 | Kennedy | F16K 27/044 |
| 11,499,646 | B2 * | 11/2022 | Kozma | F16K 37/0041 |
| 2012/0318534 | A1 * | 12/2012 | Dahlgren | F16K 35/16 |
| | | | | 169/11 |
| 2020/0141426 | A1 * | 5/2020 | Diaz | F16K 11/0704 |

* cited by examiner

PROPORTIONAL SOLENOID VALVE HAVING ZERO CURRENT DURING INTERMITTENT STATE HOLD CONDITIONS

RELATED APPLICATIONS

This application claims the benefit of, and priority to, U.S. App. No. 62/811,958 filed Feb. 28, 2019, which is hereby incorporated by reference in its entirety.

FIELD

The present invention is directed to solenoid valves.

BACKGROUND

Current proportional solenoid valve designs require current running through the solenoid's electromagnetic coil during any intermittent state. A general solenoid valve design is described in U.S. Pat. No. 7,431,263. Depending on the type of valve design, the greatest current consumption occurs when "normally open" valve designs are in the completely closed state, and when "normally closed" valves are in the completely open state. Proportional solenoid valves consume power during operation while in one or both of the completely open and completely closed states. Conventional proportional solenoid valves also consume power during operation in the intermediate states.

Designs have been made to reduce overall power consumption of proportional valves. In U.S. Pat. No. 6,604,726 for example, the invention addresses the reduction of friction resistance, or dead band, inherent in a solenoid with a slidable armature. It is well known in the art that magnetic field strength, and therefore the power consumption, required to move the actuator is greater than the power required to hold it in a fixed position. Conventional electrical designs modulate the coil current between the motion and hold states of the valve to reduce the power consumed. For example, PCT Application WO2009105410 describes improved current usage by changing the duty cycle of the electromagnet current while holding the mobile core in place as compared to while the core is in motion.

Patent EP0736882 describes circular spiral shaped stand-offs designed to reduce the amount of physical contact required to hold the mobile portion of the valve, reducing friction forces and therefore dead band electrical power consumption.

Patent WO2016176048A describes a low-profile proportional valve design which reduces the overall current consumption to operate the valve through mechanical efficiencies and reduced mass of the actuator.

In conventional solenoid valves, such as those described above, physical and electronic designs have been shown to reduce the power consumption during the intermediate hold operation of the proportional valves, but not eliminate it.

Thus, it would be desirable in the art to provide a proportional solenoid valve allowing valve positions corresponding to intermediate states to be held in a desired configuration without requiring electrical power.

SUMMARY

In an embodiment, a proportional solenoid, capable of linear motion, includes an electromagnetic valve device including a solenoid assembly having a mobile core, a push rod connecting the solenoid mobile core to a valve plunger, and a device operable to apply a controlled friction force to hold the mobile core in an intermediate position, wherein the friction force is greater than the motive forces generated by the solenoid.

In another embodiment, a method for holding a proportional valve actuator in an intermediate state by creating a controlled friction force includes energizing the solenoid valve electromagnetic coil, positioning the mobile core to the desired position, energizing the friction force, and deenergizing the solenoid valve electromagnetic coil.

In another embodiment, a method for holding a proportional solenoid valve actuator in an intermediate state by creating a controlled friction force includes energizing a solenoid valve electromagnetic coil. The electromagnetic coil is configured to apply a motive force to a mobile solenoid core. The mobile solenoid core is positioned in a desired position in contact with the proportional solenoid valve actuator and the solenoid valve electromagnetic coil is deenergized.

In another embodiment, a method for holding a proportional valve actuator in an intermediate state by creating a controlled friction force includes energizing a solenoid valve electromagnetic coil. The electromagnetic coil is configured to apply a motive force to a mobile solenoid core. The mobile solenoid core is positioned in a desired position in contact with the proportional solenoid valve actuator. A current pulse is subsequently applied to the solenoid valve electromagnetic coil and alters the contact state of the friction force. The solenoid valve electromagnetic coil is subsequently deenergized.

Provided herein is a proportional solenoid valve allowing intermediate valve states to be held in a desired configuration at very low power or without requiring any electrical power during the held state.

Applications requiring remote placement of proportional valves, away from buildings or other sources of line voltage, are particularly suited for valves employing a zero-power state during intermediate hold positions. Remote applications away from the power grid require the power supply to be resident with the device for the full duration of the valve purpose. A proportional valve design in which the valve is capable of low or zero-current holding positions in intermediate states conserves energy, such as from a battery or other portable source of electricity, allowing for extended operation without replenishment.

For example, one such application is environmental air analysis.

In an embodiment, metal canisters (or cannisters), having internal volumes ranging from one to 20 Liters are employed to collect whole air samples for subsequent analysis in the laboratory.

Standard examples of whole air sampling methods include EPA/625/R-96/010b Compendium of Methods for the Determination of Toxic Compounds in Ambient Air; Second Edition; Compendium Method TO-15; Determination Of Volatile Organic Compounds (VOCs) In Air Collected In Specially-Prepared Canisters And Analyzed by Gas Chromatography/Mass Spectrometry (GC/MS). From that method: "A sample of air is drawn through a sampling train comprised of components that regulate the rate and duration of sampling into the pre-evacuated and passivated chamber".

This type of application requires precision control of the air flow into the chamber during sampling. Constant flow into the chamber over the duration of the sampling time is important. The flow of air into the cannister is driven by the pressure drop between the exterior (1 atmosphere at sea level; generally close to 1 atmosphere at elevations relevant to Earth topology).

Cannisters are sent into the field completely evacuated. The flow path is opened and the flow rate into the cannister is maintained at a rate constant to allow sampling over the desired duration.

As the evacuated chamber fills with sampled air, the pressure inside the cannister increases. The pressure change is nonlinear, so the proportional valve opens at a rate that maintains constant flow with a nonlinear pressure drop.

Because the vacuum pressure is the motive force that creates flow into the chamber, the flow control valve continues to open to accommodate the ever-decreasing pressure drop caused by the slow filling of the chamber.

Sampling cannisters used for TO-15 and related analyses are often conducted outdoors in the field, far remote from any line power supply. Further, the duration in the field prior to the sampling may be weeks or months. Sampling times may last as long as 150 hours, during which the valve should maintain a constant flow. Smaller volume cannisters and/or long sampling times require low sampling flows.

As the cannister fills, the pressure drop decreases nonlinearly. As the cannister approaches 50% capacity (i.e., where the pressure drop between the ambient air and the cannister is approximately ½ atmosphere) the flow rate decreases to a point that the proportional valve moves very slowly, or even with periods of no motion. At these points the proportional valve is essentially held in place by the current.

For TO-15 applications, precision control of the flow through the valve often results in a lengthy, stepwise increase in the flow through the valve, particularly during the later portion of the sampling where the pressure inside the cannister approaches ambient pressure. Sampling rates requiring slow, stepwise changes in the valve opening position generated in prolonged periods where the valve state is unchanged. This stepwise increase situation is well suited for a proportional valve having a controlled friction force during these prolonged hold states throughout the valve opening sequence.

In an embodiment, a mechanism to produce a zero-power state during intermediate hold positions in proportional valves is to provide an additional force to the valve. A controllable friction force, capable of providing a resistance force to the actuator portion of the valve while in an intermediate hold state eliminates the need for the electromagnetic field hold force.

A friction force means any force employed to establishing a holding position in the proportional solenoid valve, by preventing motion of the valve plunger. The friction force provides a force that maintains a holding position of the proportional solenoid valve. For the friction force to hold the valve plunger in position it must be sufficient to overcome any combination of the basic motive forces of a solenoid valve.

In some embodiments, the friction force may be controllably varied. In some embodiments, the controllable friction force is enabled when the valve plunger of the proportional valve reaches the desired position. The position of the valve plunger may be maintained until a change in the valve state is desired. The friction force may then be disabled allowing movement of the valve plunger and subsequent change in valve state.

A friction control power means any power employed to enable a friction force. The friction control power may be electronic or mechanical, relating to current powered motion associated with the friction force. In some embodiments, the friction control power applied is inverse to the force applied. That is, as the friction force is increased, the applied friction control power may be decreased, enabling the frictional force to prevent movement without further application of power. In some embodiments, the friction control power is reduced to zero when the friction force is sufficient to maintain the position of the valve plunger in the desired valve state. The controlled friction force may be applied to the solenoid shaft, the mobile core, the push rod, the valve plunger, or a combination thereof.

The friction force may be off-axis with respect to the solenoid stroke direction. In some embodiments, the friction force may be applied tangentially to a portion of the cylindrical linear movement assembly. Examples of localized tangential friction forces include variable position cams, plungers, or clamp mechanisms. Power may be controllably supplied using secondary electronic motion control, spring resistance, or thermal expansion.

The friction force may also be applied concentrically. In one embodiment, the friction force may be applied to a cylindrical actuator. The friction device having a hole whose first inner diameter in the unpowered state is larger than the localized region of the armature, but with power applied the inner diameter of the friction device is reduced to a second smaller diameter sufficient to frictionally engage with the actuator.

Examples of techniques for imparting concentric frictional forces include reversibly deformable ferrules and elastomeric O-rings. Another example is a thermally conductive wire coil, where a first diameter under ambient conditions is sufficient to frictionally engage with the actuator, and the application of heat expands the coil diameter sufficient to release contact from the armature. Another example is a rotational solenoid, where the diameter of the through hole is controlled electromagnetically through the use of a rotating iris or clutch device.

We present mechanisms that affect a controllable friction force applied to the linear actuator of the proportional valve, where the friction force is sufficient to prevent motion of the valve. In some embodiments, the controllable friction forces are tangential to a localized region of the cylindrical actuator surfaces. In some embodiments, the controllable friction forces are concentric around a region of the linear actuator.

In one embodiment, the controllable force mechanism is configured so there is zero friction force applied to the actuator assembly in the unpowered state and in a powered state the friction force applied is sufficient to overcome any motion of the actuator.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION

Figure 1A:
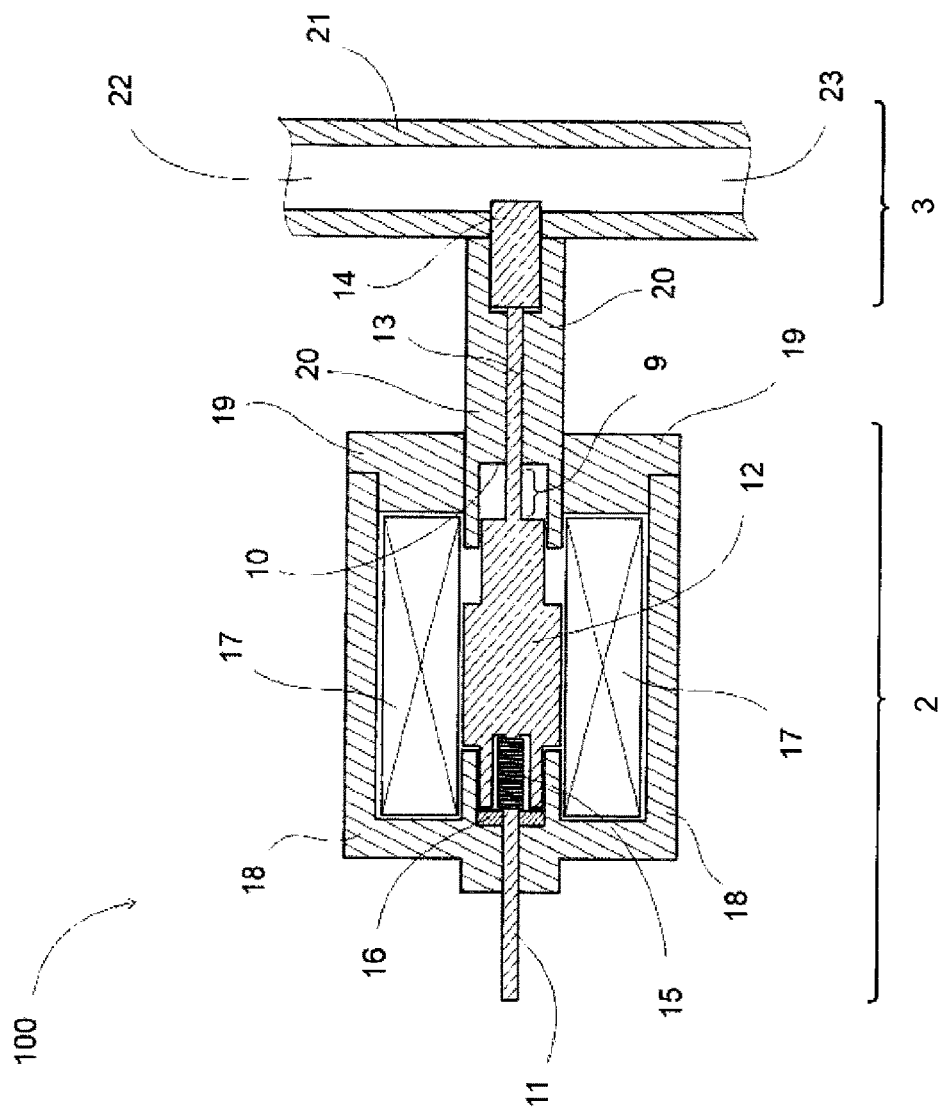
FIG. 1A: Illustrates a conventional solenoid valve with the valve in the fully open state.

In FIG. 1A, proportional valve 100 includes a solenoid subassembly 2, connected to a valve subassembly 3 by a rigid push rod 13. The solenoid assembly includes an electromagnetic coil 17 surrounding a mobile core 12.

The solenoid subassembly 2 generally includes a fixed assembly including an electromagnetic coil 17 housed in a coil yoke 18 and yoke endcap 19. The mobile portion, or actuator of the solenoid includes a mobile core/armature 12, positioned at least in part within the electromagnetic coil 17, and a solenoid rod 11 and push rod 13, which positions the mobile core 12 to ensure slidable motion of the mobile portion of the solenoid. The distance the mobile core 12 can travel is the solenoid stroke length 9, which is limited by the dimensional length of the mobile core 12 and its relative distance between mobile core stop face 10 and the latching permanent magnet 16.

Inside the solenoid is a fixed coil yoke 18 provided with an electromagnet coil 17 that generates a magnetic field when an electric current flows through the coil. A mobile core 12 responsive to the generated magnetic field slides axially between the permanent magnet 16 and the mobile core stop face 10. Four forces are generally present in the solenoid that affect motion of the mobile core 12; the spring resistance as the spring 15 is compressed by the mobile core 12, the latching permanent magnet 16 attractive force which acts as a holding force when the mobile core 12 is in contact with the magnet 16, the magnetic field generated by the electromagnetic coil 17, which drives the mobile core 12 in either direction depending on the current direction in the coil 17, and friction resistance resident throughout the solenoid with respect to contact of the solenoid rod 11, the mobile core 12, and the mobile elements of the valve subassembly 3.

The permanent magnet 16 provides a holding or latching force to the mobile core 12 when the core is positioned to make contact with the permanent magnet. A spring 15 is compressed when the mobile core 12 is latched to the permanent magnet 16. With respect to the mobile core 12, the repulsion force of the compressed spring 15 is less than the attraction force of the permanent magnetic 16. When the solenoid is powered to disengage the core 12 from the permanent magnet 16, the spring provides an opposing force with respect to permanent magnet which allows less current required in the electromagnetic coil to release the mobile core 12. The spring force also promotes a higher degree of precision of the overall stroke mechanism of the solenoid, with respect to the magnetic field generated by electromagnetic coil.

The valve subassembly 3 includes a fluid flow tube 21 with an inlet 22 and an outlet 23, and a valve plunger 14 device capable of moving in and out of the fluid flow tube 21, thereby occluding the fluidic conductance through the fluid flow tube 21. The valve plunger 14 is attached to the solenoid mobile core 12 by a push rod 13. In this fashion the degree to which the plunger 14 occludes the flow tube 21 is determined by the motion of the mobile core 12, and in turn the current flowing through the electromagnetic coil 17. Proportional valve designs provide for partial occlusion of the tube 21 with the plunger 14 using a proportional current to the electromagnetic coil 17.

Proportional valves provide all possible states between completely open (full flow rate) and completely off (zero flow) states. Any position between completely open and completely off states represents an intermediate state. Holding position means maintaining a specific valve state, where the aperture of the valve subassembly 3 is constant. FIG. 1A illustrates the proportional valve 100 in the completely open state. Here the mobile core 12 is in contact with the latching permanent magnet 16, which provides the force necessary to maintain the valve subassembly 3 in the completely open holding position.

Figure 1B:
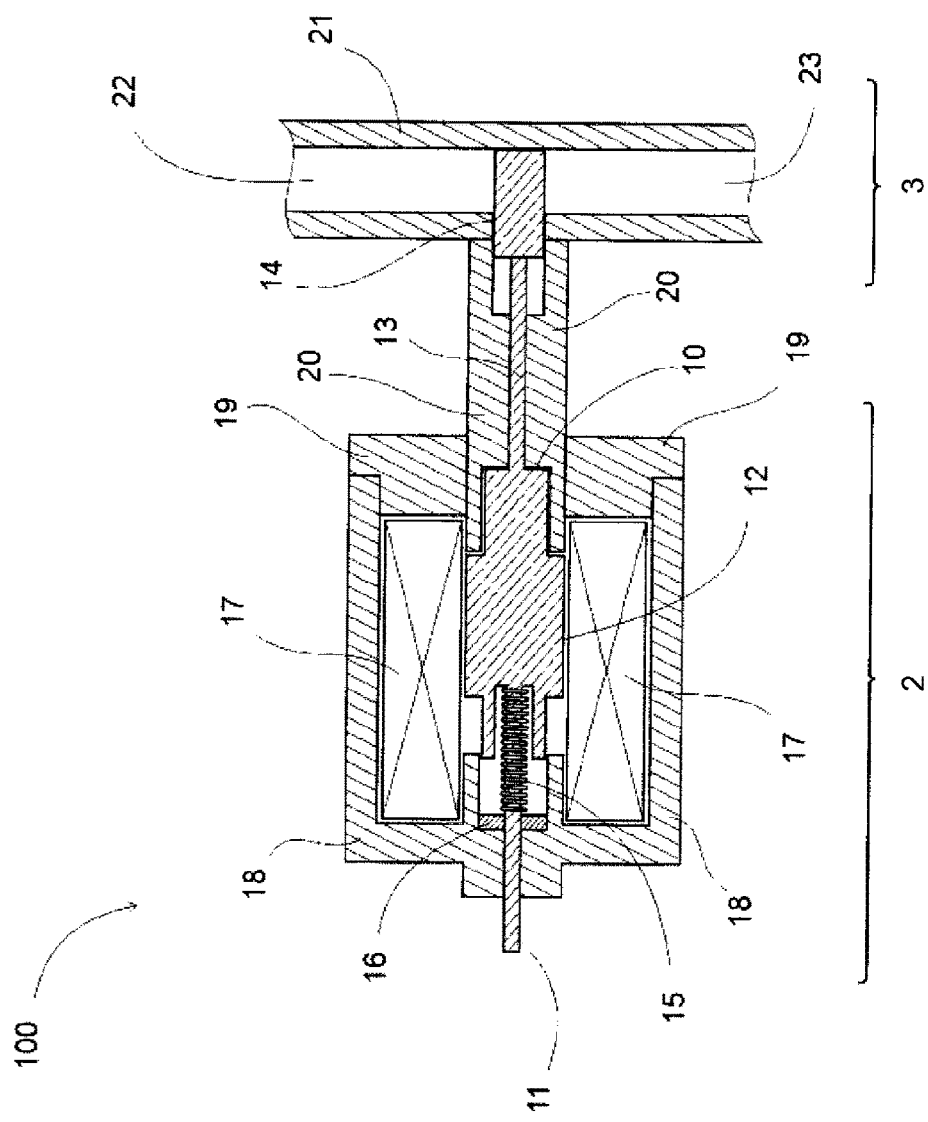
FIG. 1B: Illustrates a conventional solenoid proportional valve with the valve in the fully closed state.

FIG. 1B illustrates the proportional valve 100 in the completely closed state. Here the combination of the spring 15 coil force and the electromagnetic field force generated by the coil 17 combine to maintain the valve plunger 14 to occlude the fluid flow tube 21. Because the spring coil force is insufficient to maintain the completely closed state, the electromagnetic field must be maintained, which in turn requires continuous electric current.

Figure 2:
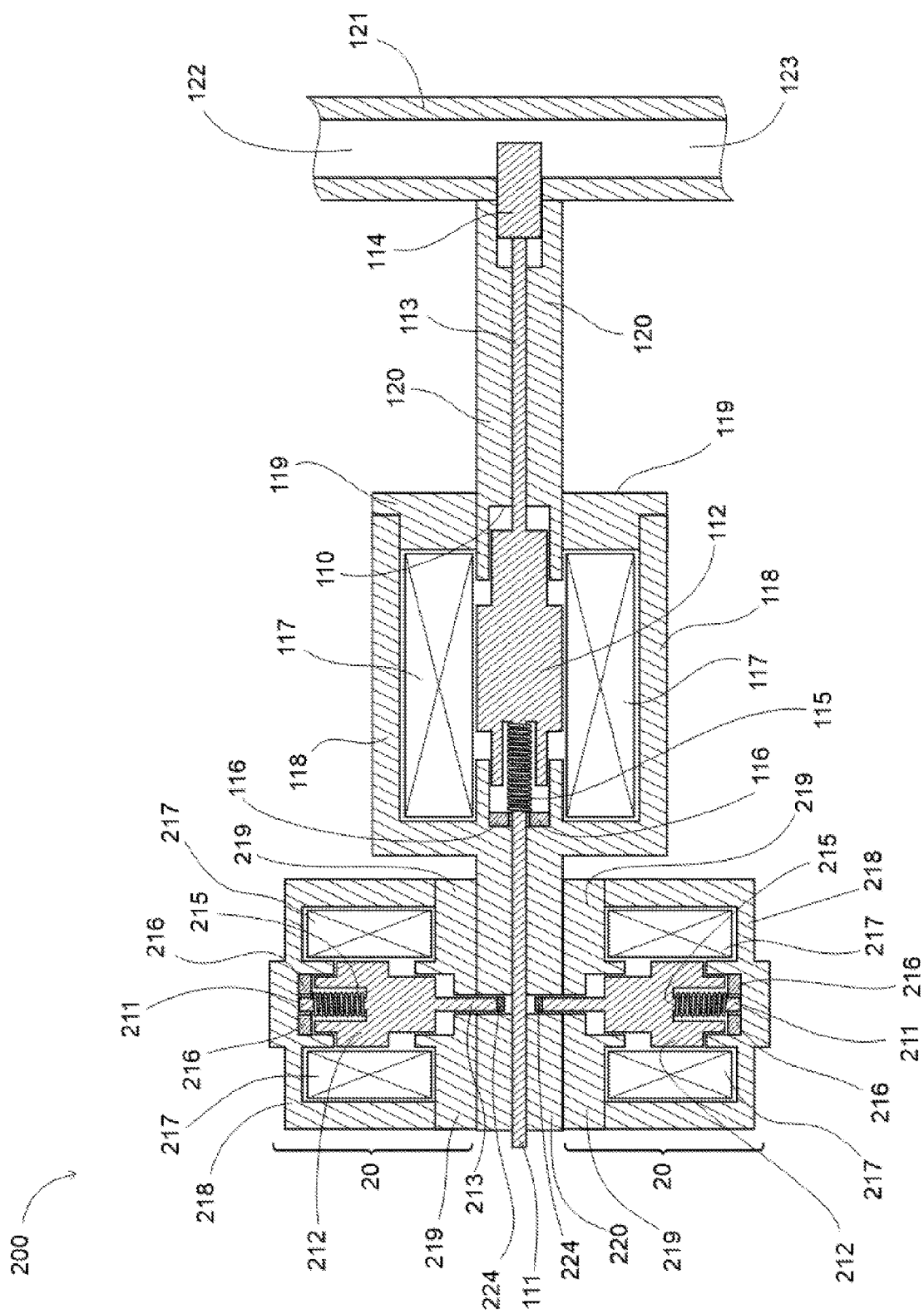
FIG. 2: Illustrates a solenoid proportional valve with a solenoid-driven controllable friction force interfaced with the solenoid shaft.

FIG. 2 illustrates a proportional valve assembly 200 having two second solenoids 20 disposed on a solenoid rod 111 to deliver a friction force to the solenoid rod 111.

In FIG. 2, proportional valve 200 includes a solenoid subassembly 101, connected to a valve subassembly 102 by a rigid push rod 113. The solenoid assembly includes an electromagnetic coil 117 surrounding a mobile core/armature 112.

The solenoid subassembly 101 generally includes a fixed assembly including an electromagnetic coil 117 housed in a coil yoke 118 and yoke endcap 119. The mobile portion, or actuator of the solenoid includes a mobile core 112, positioned at least in part within the electromagnetic coil 117, and a solenoid rod 111 and push rod 113, which positions the mobile core 112 to ensure slidable motion of the mobile portion of the solenoid. The distance the mobile core 112 can travel is the solenoid stroke length 109, which is limited by the dimensional length of the mobile core 112 and its relative distance between mobile core stop face 110 and the latching permanent magnet 116.

Inside the solenoid is a fixed coil yoke 118 provided with an electromagnet coil 117 that generates a magnetic field when an electric current flows through the coil. A mobile core 112 responsive to the generated magnetic field slides axially between the permanent magnet 116 and the mobile core stop face 110. Four forces are generally present in the solenoid that affect motion of the mobile core 112; the spring resistance as the spring 115 is compressed by the mobile core 112, the latching permanent magnet 116 attractive force which acts as a holding force when the mobile core 112 is in contact with the magnet 116, the magnetic field generated by the electromagnetic coil 117, which drives the mobile core 112 in either direction depending on the current direction in the coil 117, and friction resistance resident throughout the solenoid with respect to contact of the solenoid rod 111, the mobile core 112, and the mobile elements of the valve subassembly 102.

The permanent magnet 116 provides a holding or latching force to the mobile core 112 when the core is positioned to makes contact with the permanent magnet. A spring 115 is compressed when the mobile core 112 is latched to the permanent magnet 116. With respect to the mobile core, the repulsion force of the compressed spring 115 is less than the attraction force of the permanent magnetic 116. When the solenoid is powered to disengage the core 112 from the permanent magnet 116, the spring provides an opposing force with respect to permanent magnet which allows less current required in the electromagnetic coil to release the mobile core. The spring force also promotes a higher degree of precision of the overall stroke mechanism of the solenoid, with respect to the magnetic field generated by electromagnetic coil.

The valve subassembly 102 includes a fluid flow tube 121 with an inlet 122 and an outlet 123, and a valve plunger 114 device capable of moving in and out of the fluid flow tube 121, thereby occluding the fluidic conductance through the fluid flow tube 121. The valve plunger 114 is attached to the solenoid mobile core 112 by a push rod 113. In this fashion the degree to which the plunger 114 occludes the flow tube 121 is determined by the motion of the mobile core 112, and in turn the current flowing through the electromagnetic coil 117. Proportional valve designs provide for partial occlusion of the tube 121 with the plunger 114 using a proportional current to the electromagnetic coil 117.

The second solenoid 20 generally includes a fixed assembly including an electromagnetic coil 217 housed in a coil yoke 218 and yoke endcap 219. The mobile portion, or actuator of the second solenoid 20 includes a mobile core 212, positioned at least in part within the independently controlled electromagnetic coil 217, and a solenoid rod 211 positioned at least partially within a solenoid rod sleeve 220, a push rod 213, which positions the mobile core 212 to ensure slidable motion of the mobile portion of the second solenoid 20, and a latching magnet 216. The open end of the push rod 213 is attached to a push rod grip 224. This grip may be any material suitable that helps increase the friction, as the force of the solenoid rod 211 of the second solenoid 20 is sufficient to hold the solenoid rod 111 in place, regardless of any motive force generated particularly by the electromagnetic coil 117 or the spring 115.

Push rod grip 224 may be polymeric materials, preferably having some elastomeric properties in order to deformably contact the curved push rod surface and increase the contact surface area of the friction force.

The friction force deriving from the push rod 213 and the push rod grip 224 is tangential with respect to the axial direction of the solenoid rod 111 and localized to a portion of the radial surface of solenoid rod 111.

Energizing the electromagnetic coils 217 of the second solenoids 20 is independent to the movement of the proportional valve mobile core 112. Control circuitry may be used to link the control of the second solenoid to the proportional valve state, where the position of the proportional valve mobile core 112 is monitored. The control circuitry may then control the operation of the second solenoids when a desired holding position of the core 112 is determined.

In the unpowered state, the second solenoid 20 push rod 213 is fully extended, with the push rod grip 224 pressed against solenoid rod 111. The motive force from spring 215, also called a locking plunger spring or armature spring of the second solenoid 20 are available to maintain contact between the push rod grip 224 and solenoid rod 111 and are greater than the motive forces relating to the motion if the proportional valve actuator assembly.

When it is desired to change the position of the proportional valve, the second solenoid 20 is energized to move the mobile core 212 and push rod 213 away from the solenoid rod 111 and the friction grip 214 is disengaged from the solenoid rod 111. In some second solenoid designs, electromagnetic current is required to maintain one or the other state where the two basic states correspond to the two states 'push rod grip 224 fully disengaged from the solenoid rod 111' and 'fully engaged'.

In some preferred second solenoid designs, electromagnetic current is only required as a pulse to change the state of the second solenoid and the resulting state is maintained with standard solenoid latching devices.

Two second solenoids 20 are shown in FIG. 2, positioned on opposite radial sides of the solenoid rod 111. The use of more than one second solenoid may provide symmetrically distributed friction forces around the solenoid rod 111 in order to reduce the risk of binding or deforming the solenoid rod 111. It will be appreciated that frictional forces may be applied with a single second solenoid 20. In cases where binding or deformation of the proportional valve actuator is not a concern, a single second solenoid 20 may be used.

Figure 3:
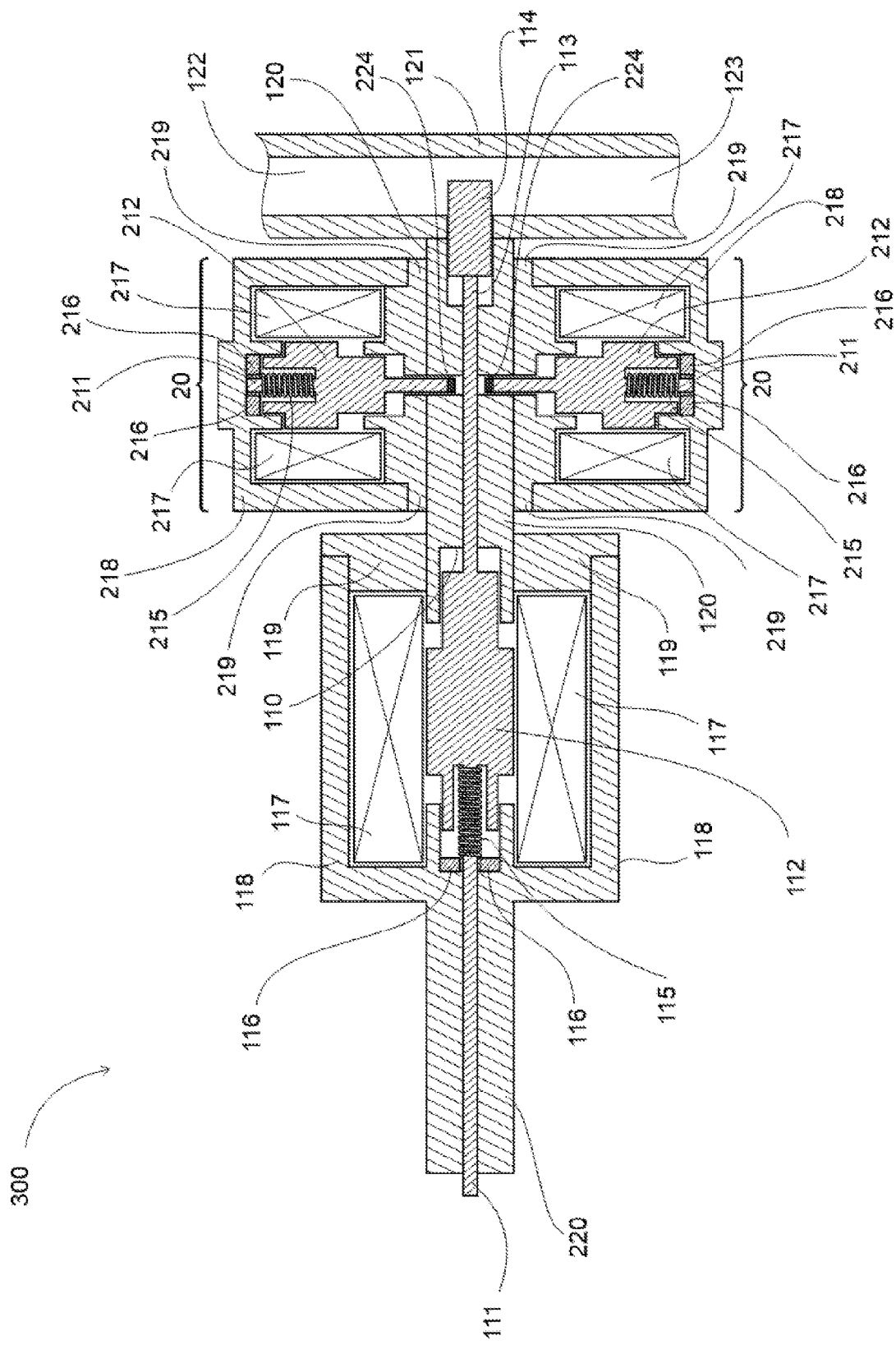
FIG. 3: Illustrates a solenoid proportional valve with a solenoid-driven controllable friction force interfaced with the solenoid push rod.

FIG. 3 illustrates a solenoid proportional valve 300 having a controlled friction force provided by two second solenoids 20, positioned on opposite radial sides of the push rod sleeve 120. The second solenoids 20, may be operated in a manner similar to that described above to provide friction force to the push rod 113. In one embodiment, the second solenoids 20 may provide symmetrically distributed friction forces around the push rod 113 in a manner similar to that described above.

The use of more than one second solenoid 20 may provide symmetrically distributed friction forces around the push rod sleeve 120 in order to reduce the risk of binding or deforming the push rod sleeve 120. In cases where binding or deformation of the proportional valve actuator is not a risk however, a single second solenoid may be used.

Figure 4:
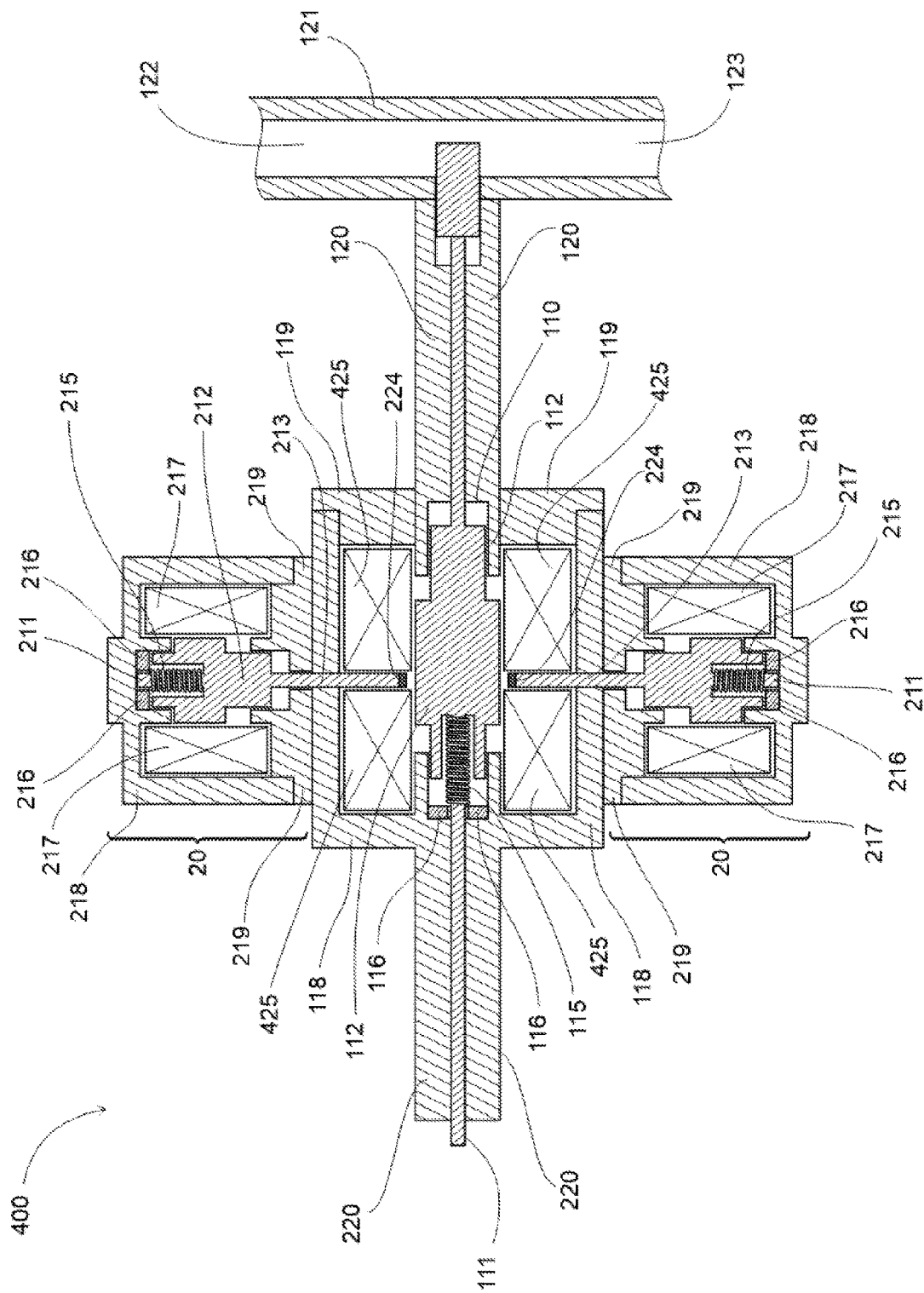
FIG. 4: Illustrates a solenoid proportional valve with a solenoid-driven controllable friction force interfaced with the solenoid mobile core.

FIG. 4 illustrates a solenoid proportional valve 400 having a controlled friction force provided by two second solenoids 20, positioned on opposite radial sides of the mobile core 112.

This configuration accesses to the mobile core surface between electromagnetic cores 425, disposed on either side to push rod 213 to provide a magnetic field sufficient to drive the mobile core to any position within the stroke length 109.

Figure 5:
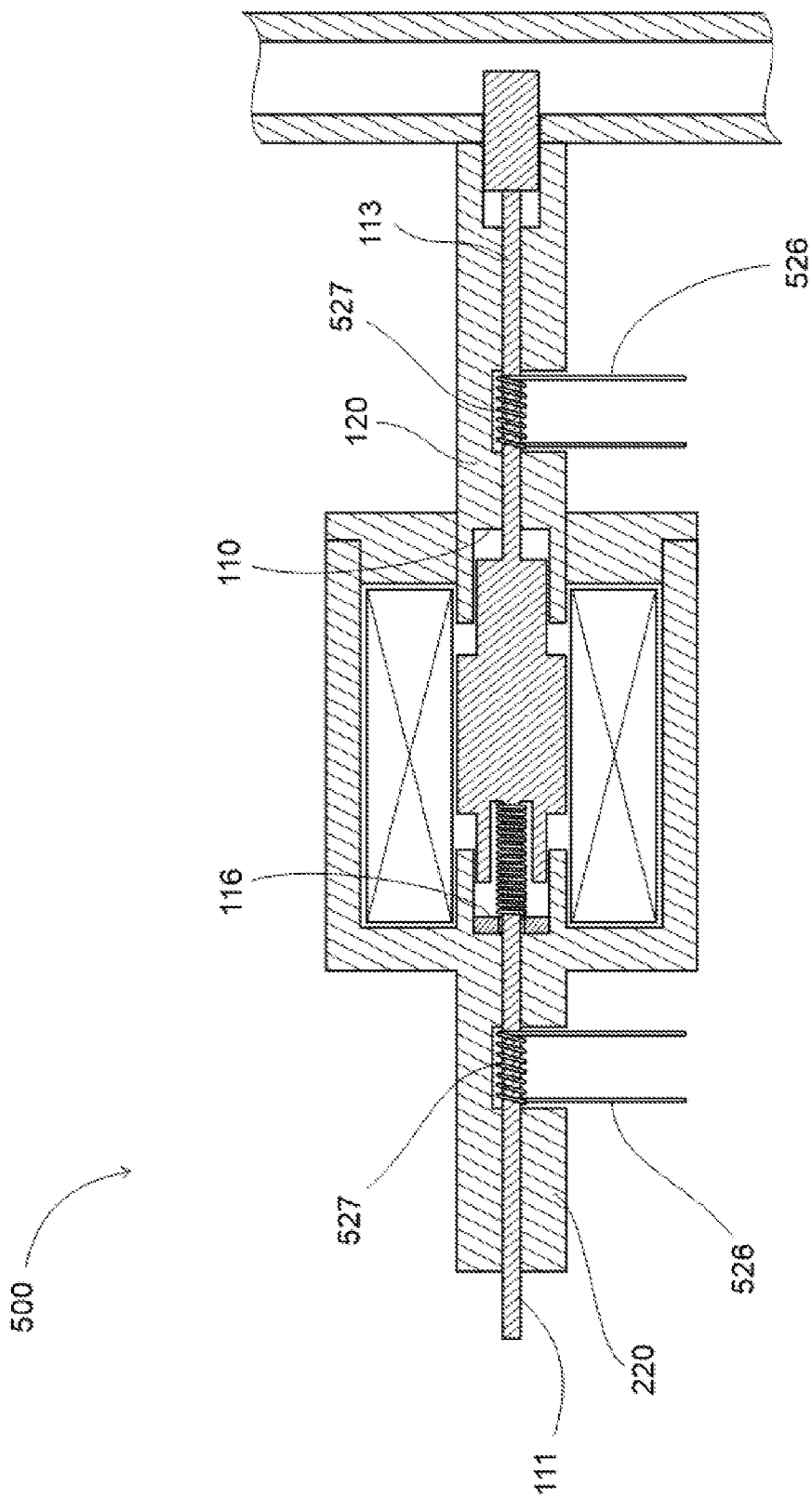
FIG. 5: Illustrates a solenoid proportional valve with a thermal wire-driven controllable friction force interfaced with the solenoid shaft and the solenoid push rod, respectively.

FIG. 5 illustrates a solenoid proportional valve 500 with a coil wire 526, wrapped around the solenoid rod 111 and push rod 113, respectively. The coil wire 526 surrounds a portion of the actuator, where a first coil diameter in the unpowered state is sufficiently small to frictionally engage with the actuator, providing friction force capable of holding the actuator in the desired location. A portion of the coil wire 527 contacts the actuator when the coil exhibits the first coil diameter thus applying the friction force. The second coil inner diameter is greater than the diameter of the actuator region, thus permitting free motion of the actuator under the influence of the proportional valve motive forces. It will be appreciated that unlike various other embodiments, the embodiment of FIG. 5 employs a hold current to maintain the intermediate position of the valve.

The second coil diameter is controlled either by rotation of one end of the coil using a rotational solenoid (not shown), or through heating of the coil to affect thermal expansion of the overall coil diameter. In the same case as when second solenoid valves are employed, one coil may be sufficient to hold the proportional valve actuator in place. The invention may employ the coil located on the solenoid rod 111, or the push rod 113, or both.

Figure 6A:
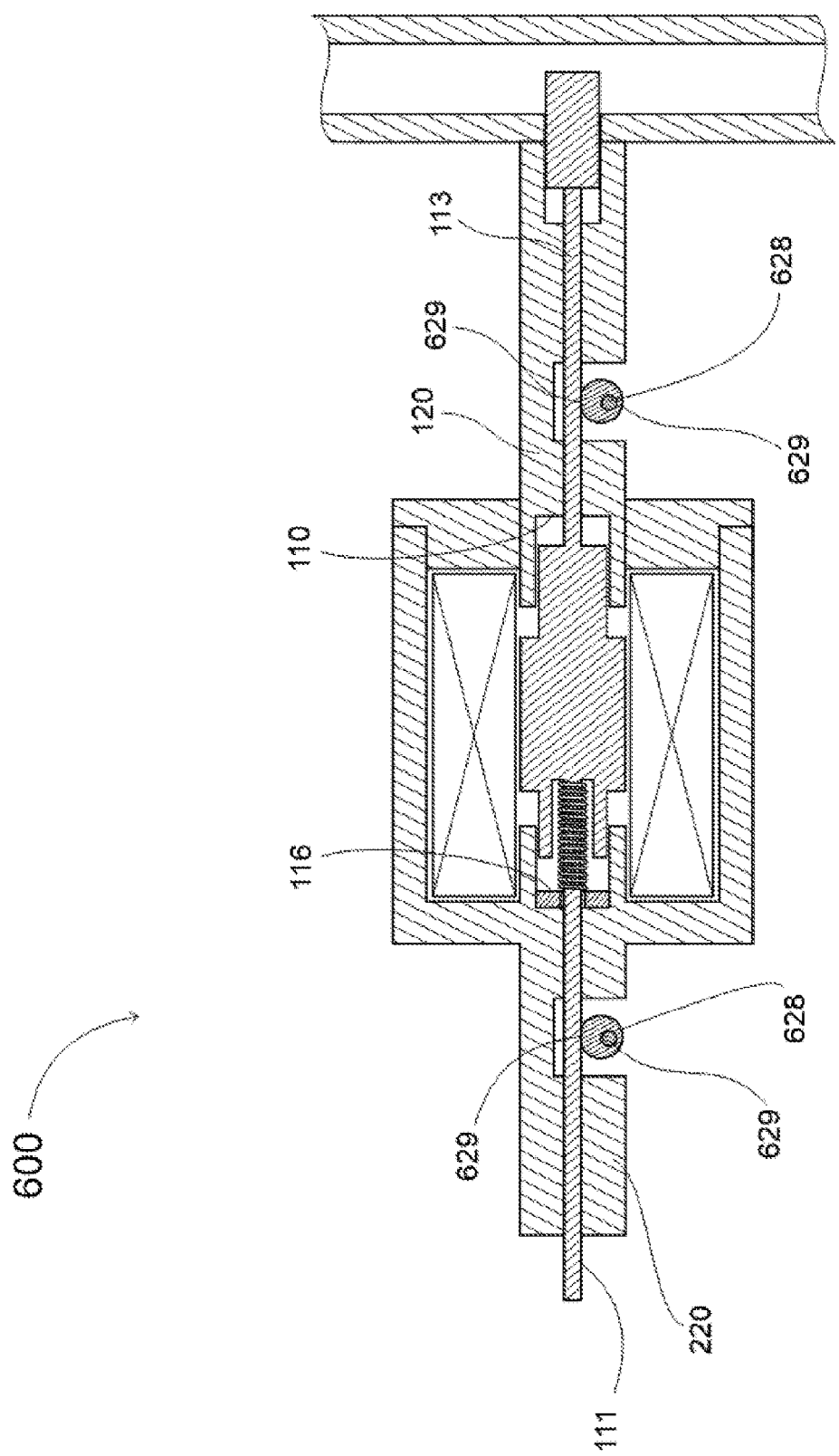
FIG. 6A: Illustrates a solenoid proportional valve with a rotating cam-driven controllable friction force. The two cams are presented in the disengaged, zero friction force state with respect to the solenoid shaft and the solenoid push rod, respectively.
Figure 6B:
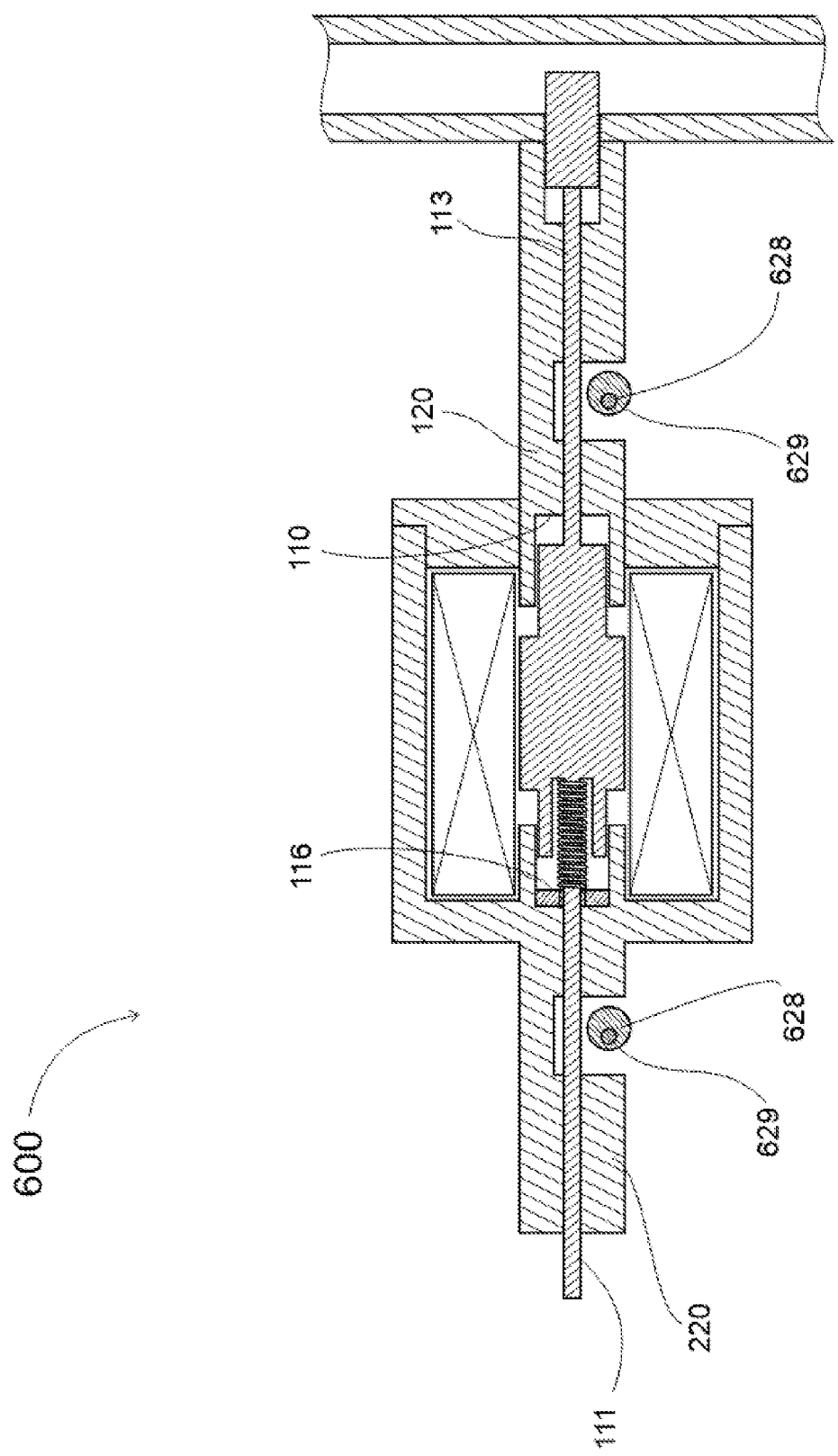
FIG. 6B: Illustrates a solenoid proportional valve with a rotating cam-driven controllable friction force. The two cams are presented in the engaged, full friction force state with respect to the solenoid shaft and the solenoid push rod, respectively.

FIG. 6A illustrates a solenoid proportional valve 600 with a frictional force provided by a rotating cam. The cams 629 are in the hold position, with the outer surface of cam 629 in direct contact with the solenoid rod 111 or push rod 113. In FIG. 6B, to switch to the zero-frictional force condition, the cams 629 are rotated about an axle 628, releasing the contact from the solenoid rod 111 or push rod 113 respectively. The cam design only requires power during the transition from zero-friction to full friction and back and does not require power during the entire hold state of the proportional valve.

One cam located on the solenoid rod 111, or the push rod 113 may be sufficient to hold the proportional valve actuator in place.

Figure 7:
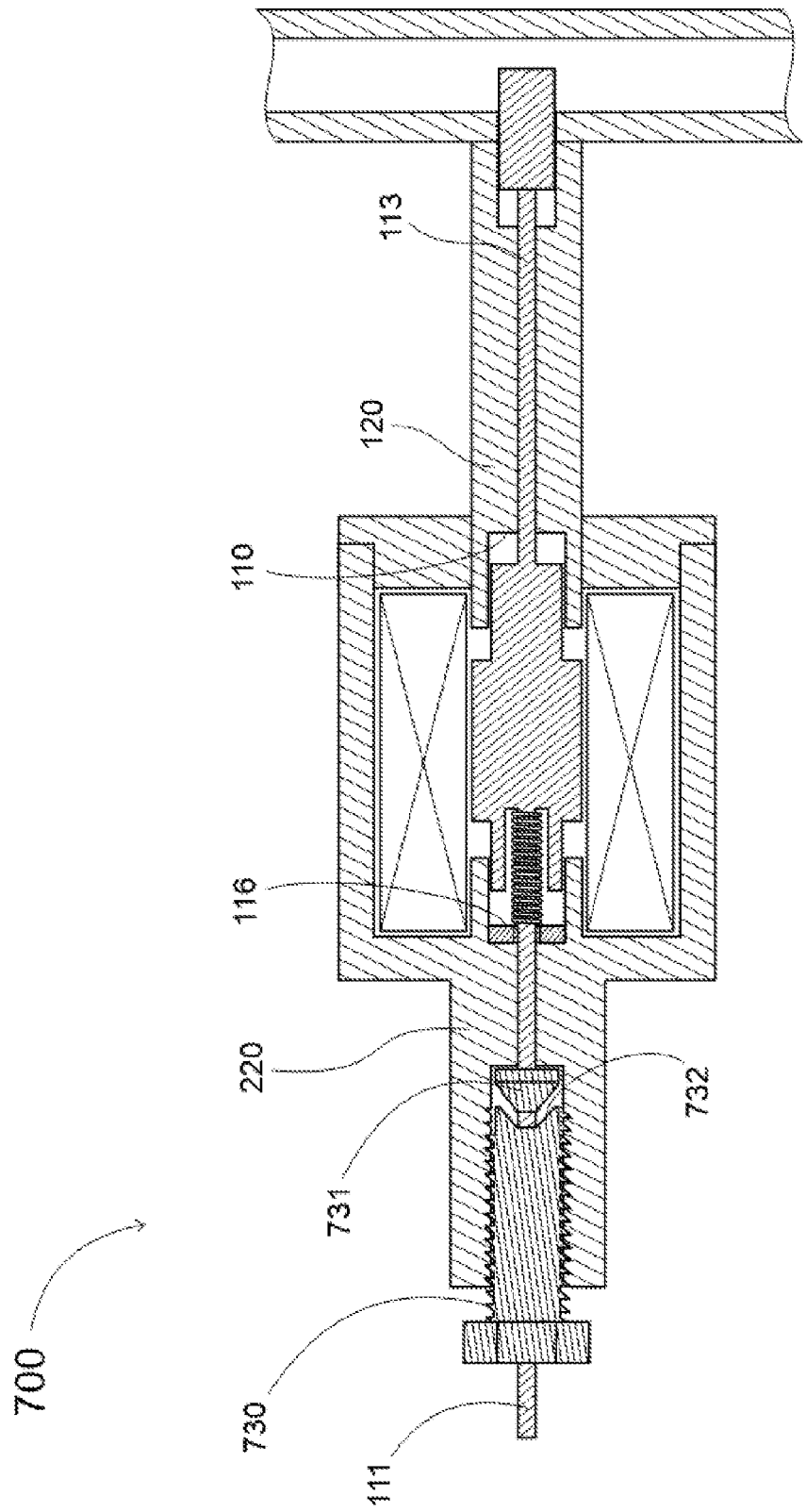
FIG. 7: Illustrates a solenoid proportional valve with a screw-driven compression ferrule interfaced with the solenoid shaft controllable friction force. The screw and ferrule assembly is in the fully disengaged zero friction force state.

FIG. 7 illustrates a solenoid proportional valve 700 with a frictional force provided by a deformable ferrule 731. Here the solenoid rod 111 runs through a threaded fitting 730 having a channel therethrough, and a ferrule 731 whose taper couples to the inner conical surface 732. The interaction of the inner conical surface 732 and ferrule 731 provides a reversible compression force against the solenoid rod 111 to hold it in a fixed position. To release the solenoid rod 111 the threaded fitting 730 is rotated in the opposite direction and the ferrule compression is relaxed.

The threaded fitting may be driven using a rotational solenoid (not shown) or other controllable electric rotational mechanism.

Figure 8:
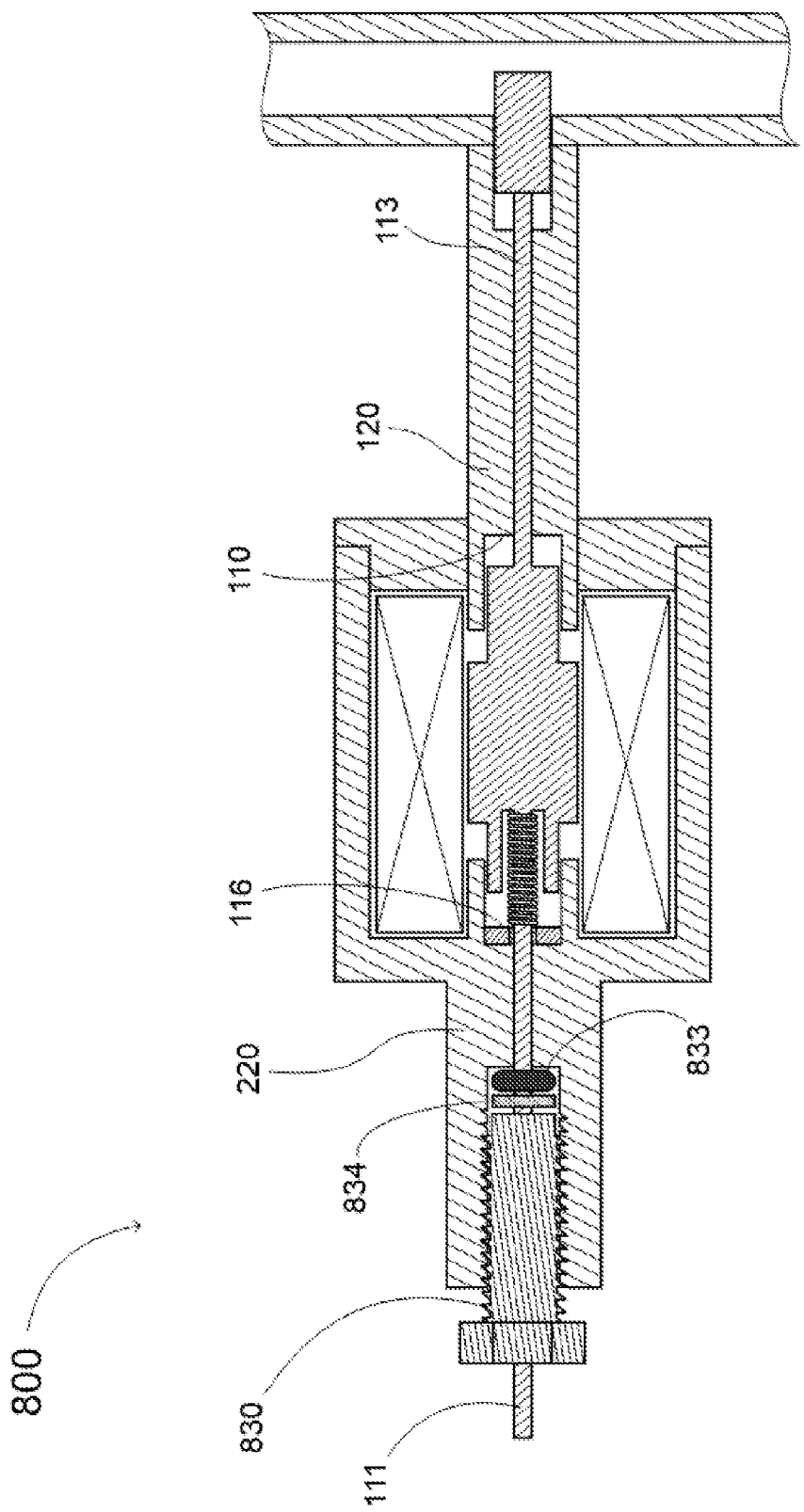
FIG. 8: Illustrates a solenoid proportional valve with a screw-driven compression O-ring interfaced with the solenoid shaft controllable friction force. The screw and O-ring assembly is in the fully disengaged zero friction force state.

FIG. 8 illustrates a solenoid proportional valve 800 with a frictional force provided by a deformable O-ring 833. Here the solenoid rod 111 runs through a threaded fitting 830 having a channel therethrough, and a washer 834 to provide slidable contact between the fitting 830 and O-ring 833. The interaction of the fitting 830 and O-ring 833 provides a reversible compression force against the solenoid rod 111 to hold it in a fixed position. To release the solenoid rod 111, the threaded fitting 830 is rotated in the opposite direction and the O-ring compression is relaxed.

The threaded fitting may be driven using a rotational solenoid (not shown) or other controllable electric rotational mechanism.

Figure 9A:
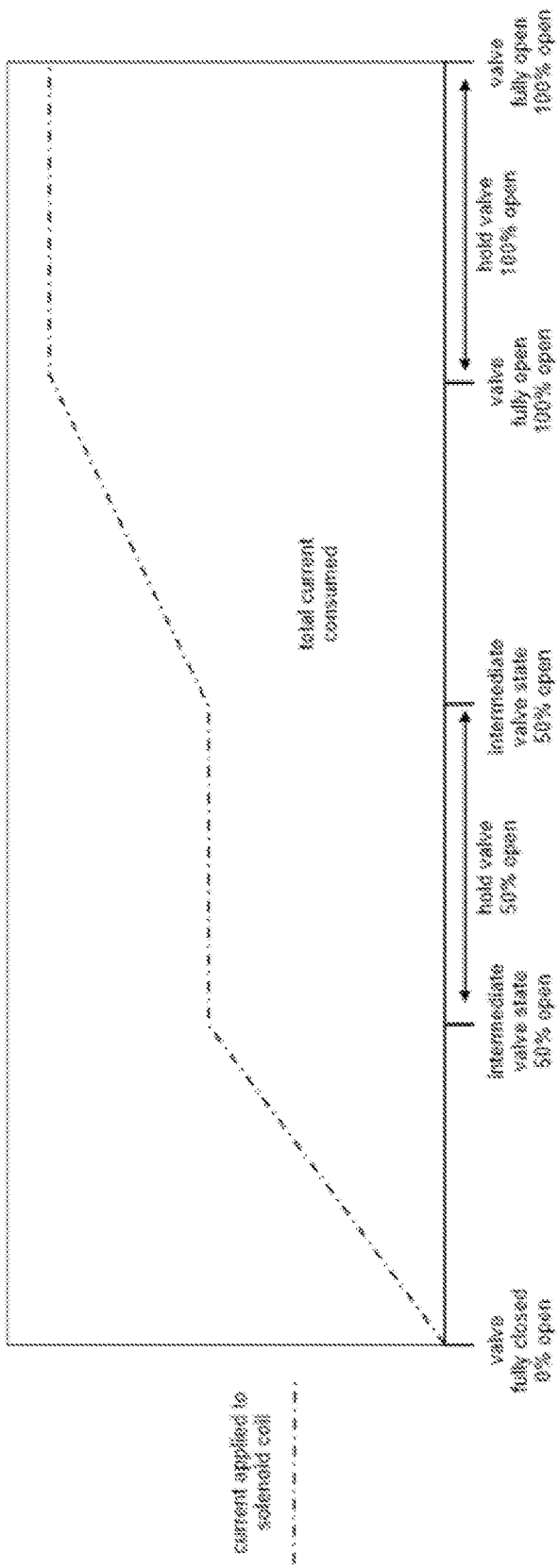
FIG. 9A: Illustrates the relationship between current consumption versus valve position using a standard proportional solenoid valve. Run conditions span includes the valve states from 0% open to 100% open, with two hold periods where the valve position is sustained.
Figure 9B:
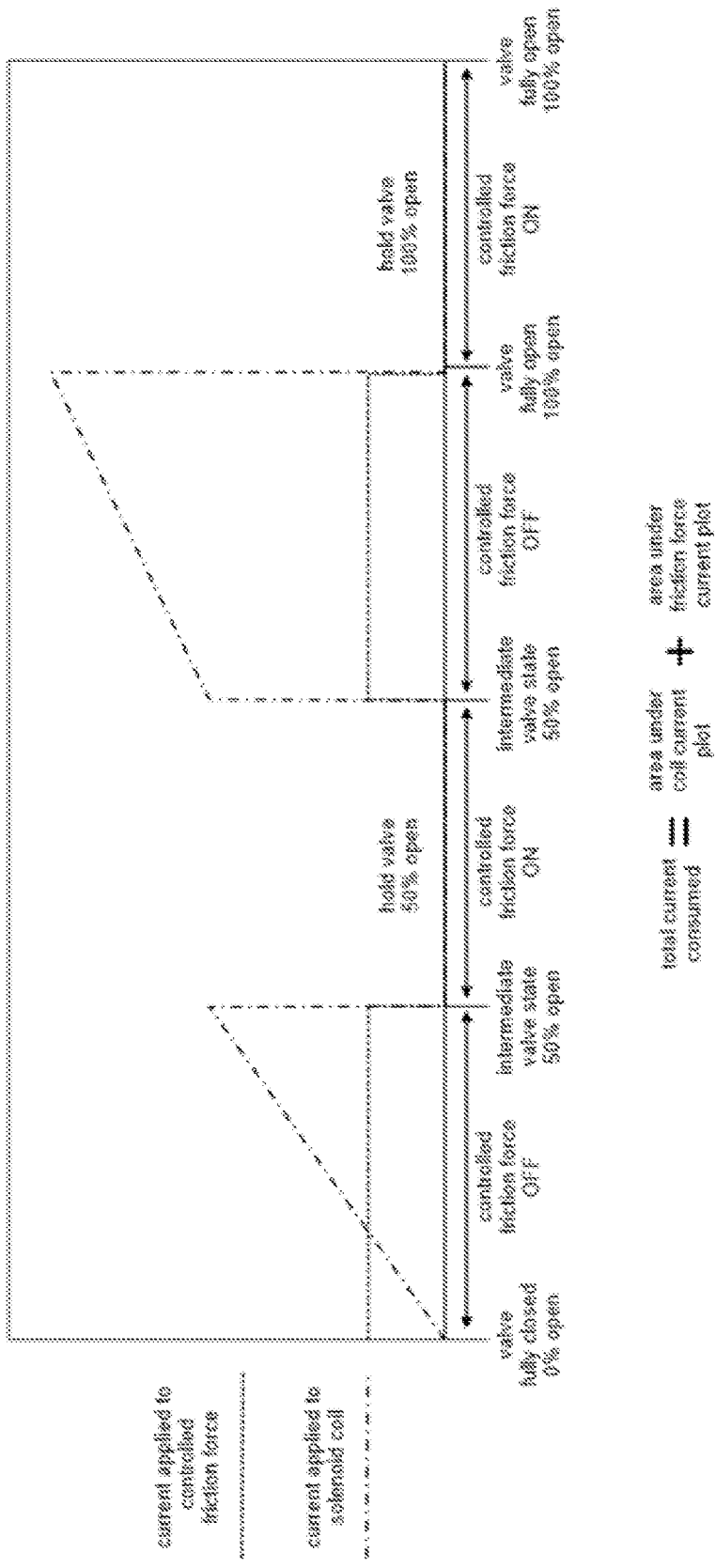
FIG. 9B: Illustrates the relationship between current consumption versus valve position using a proportional solenoid valve employing a controlled friction force, where the force requires continuous current to remain disengaged. Run conditions span includes the valve states from 0% open to 100% open, with two hold periods where the valve position is sustained.
Figure 9C:
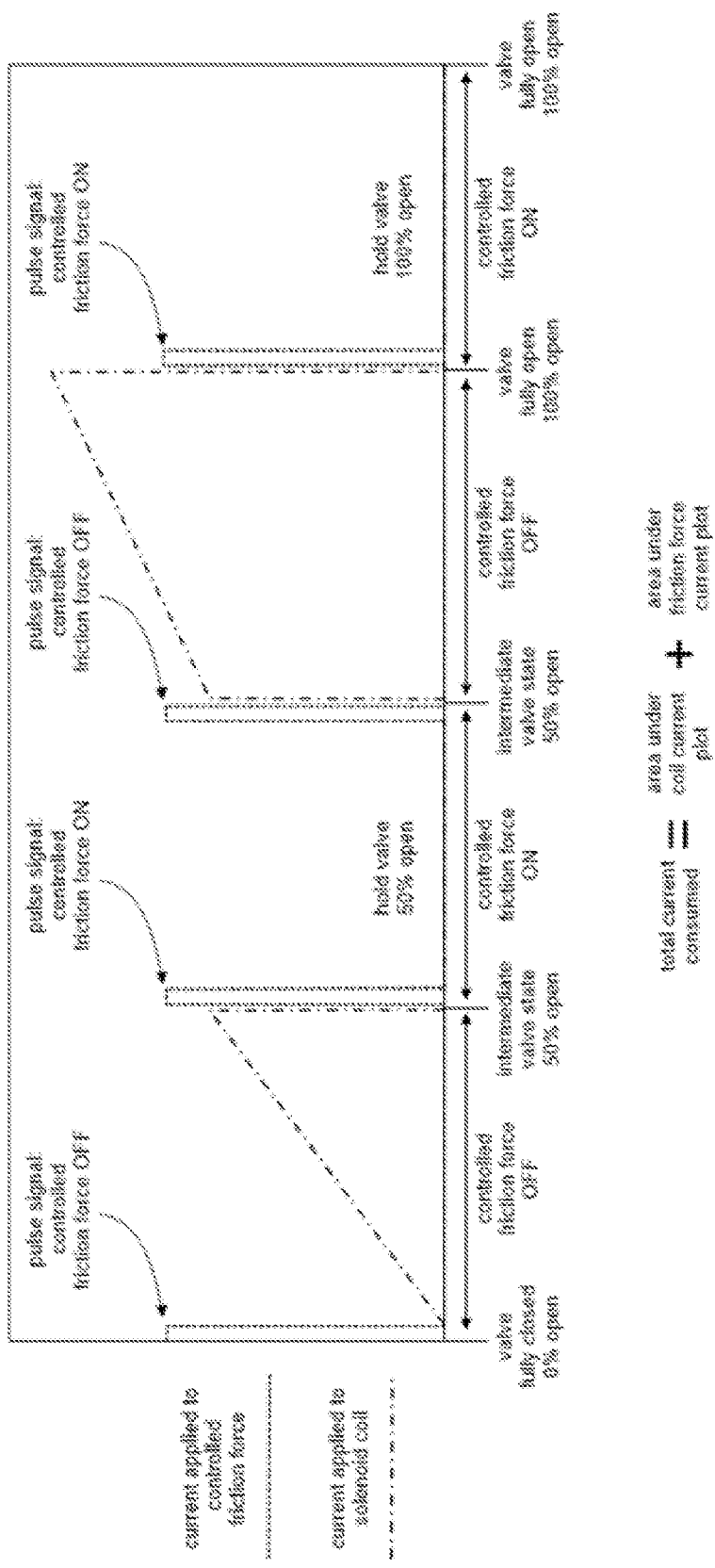
FIG. 9C: Illustrates the relationship between current consumption versus valve position using a proportional solenoid valve employing a controlled friction force, where the force requires short current pulses to change the state of the friction force mechanism from engaged to disengaged. Run conditions span includes the valve states from 0% open to 100% open, with two hold periods where the valve position is sustained.
Figure 10:
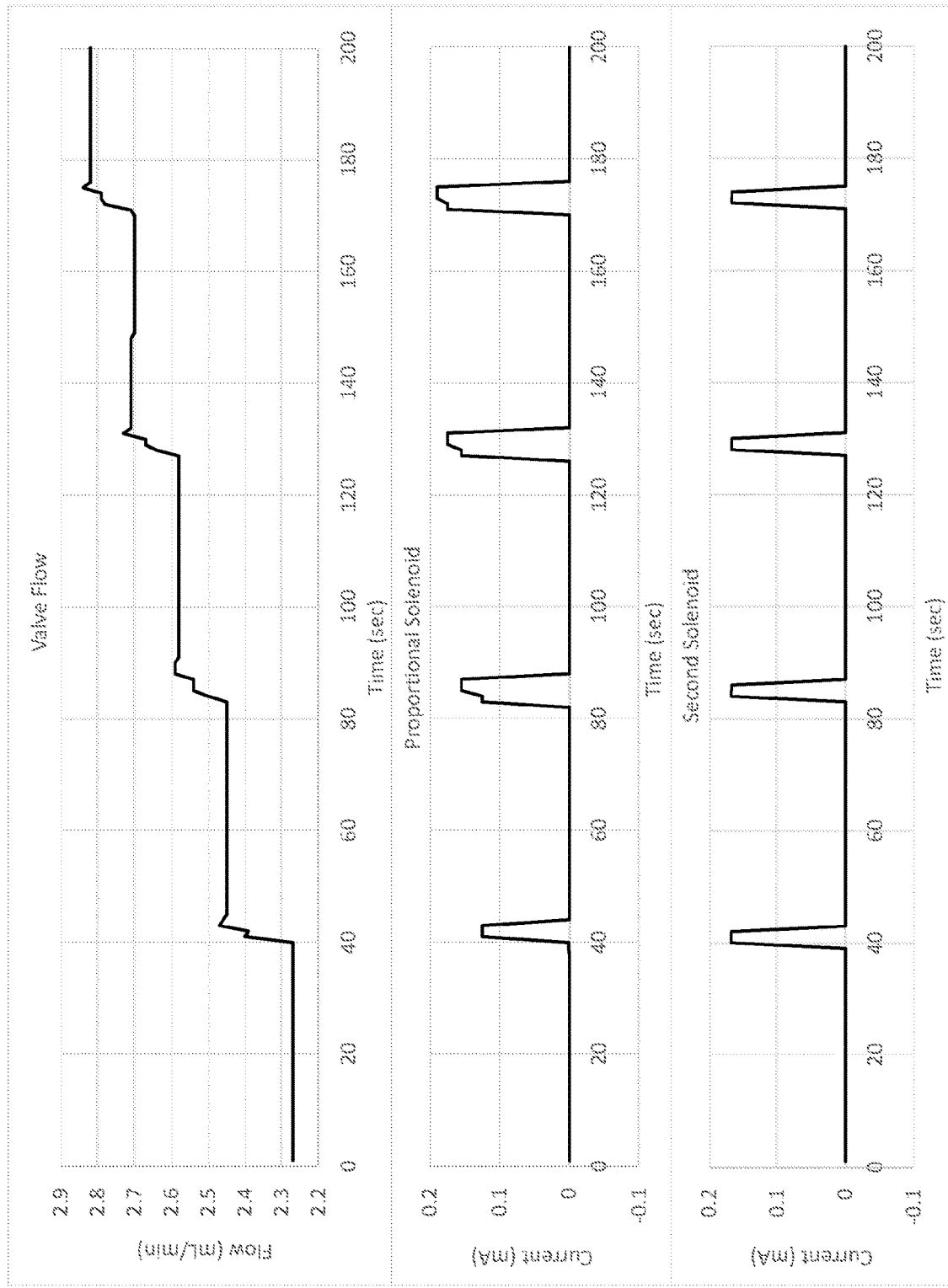
FIG. 10: Illustrates the relationship between the current of the proportional solenoid versus valve position and the current applied to disengage a frictional force of the second solenoid.

FIG. 9 is a conceptual description of the current consumption during operation of embodiments according to the invention. FIG. 10 illustrates an experimental example of the current consumption of the proportional solenoid and second solenoids in relationship to the valve position.

In the embodiments of FIGS. 9 and 10 the current consumption of the proportional solenoid and second solenoids are shown in relationship to the valve position. Current is applied to the second solenoid to cause the second solenoid 20 mobile core 212 and push rod 213 to move relative to the mobile core 112 of the valve assembly 200 and disengage the frictional force from the mobile core 112. The current applied to the proportional solenoid imparts motive force to the mobile core 112 allowing the valve position to change. The current applied to the second solenoid 20 is then discontinued allowing the mobile core 212 of the solenoid 20 to reposition and reapply a frictional force suitable to hold the valve 200 in its desired position.

Experimental Setup

Device:
The device under test was modeled after the valve layout shown in FIG. 3 with the primary difference being the use of only a single secondary solenoid. A frame for the device was built by 3D printing in a suitable form to accept an off the shelf proportional solenoid coil that was removed from a Parker VSO Max HP Miniature High Pressure High Flow Proportional Valve (p/n 921-211051-000). The frame, stationary pole piece, and flat spring were also used from this valve. A custom plunger was fabricated to interface between these off the shelf parts and the custom valve frame. A secondary coil was constructed by 3D printing a bobbin identical to that of the primary solenoid then winding 3000 turns of 35 AWG magnet wire onto it. An off the shelf spring for the secondary coil was sourced from McMaster-Carr (p/n 9657K272). The remaining parts of the mechanism were lab built to suit the design. Friction components were machined out of copper to take advantage of its high coefficient of friction.

Lab Equipment:
Agilent E3547A power supply
Agilent E3631A power supply
Savant VP100 rotary vane vacuum pump
Alicat MC-5SLPM-D-.25VCRM/5M flow controller Layout:
The valve was connected to a gas flow controller (Alicat p/n MC-5SLPM-D-.25VCRM/5M) using standard Swagelok gas fittings. These were connected to a standard laboratory rotary vane vacuum pump via a length of ¼" nylon tubing and industry standard vacuum fittings. Each solenoid coil was individually connected to a laboratory power supply capable of operating in current control mode. Both power supplies as well as the gas flow controller were connected to a computer via their RS-232 ports for programmatic control. Custom software was written to control the sequence of movement of the valve mechanisms through the power supplies and to read in flow data from the flow controller.

Operation:

The vacuum pump was energized to provide a potential sufficient to induce a flow through the valve. The flow controller set point was adjusted to its full scale range of 3 L/min so as serve purely as a flow meter and not influence the lower rate of flow being controlled by the proportional valve under test. The computer software controlled the output of the power supplies to automate the motion sequence for the secondary coil consistent with FIG. 9B in addition to providing systematically increasing current to the proportional coil. During this sequence, the flow controller's measurement functionality was used to determine the flow rate that corresponded to the valve plungers reaction to the proportional solenoid current. The flow rate through the valve was also recorded after the solenoid coils were de-energized with the valve in its "latched" state.

Results:

It will be appreciated that when the secondary coil is energized, the friction device is retracted allowing the valve plunger to be positioned proportionally to the current present in the proportional coil. When the secondary coil is de-energized, the friction device is extended under spring power into contact with the plunger and provides sufficient friction to hold the plunger in a fixed position. The proportional coil can then subsequently also be de-energized and the valve maintains its set position and corresponding flow rate with the valve consuming no power. The experimental results are shown in FIG. 10.

It will be appreciated that no current need be applied to the valve assembly in various embodiments in order to maintain the valve in its desired position. This is in contrast to conventional solenoid valves which may require a hold current to maintain their desired operating position. The elimination of the need for a hold current in the valve system may reduce the overall power consumption of systems employing the inventive solenoid valve assembly.

Figure 11:
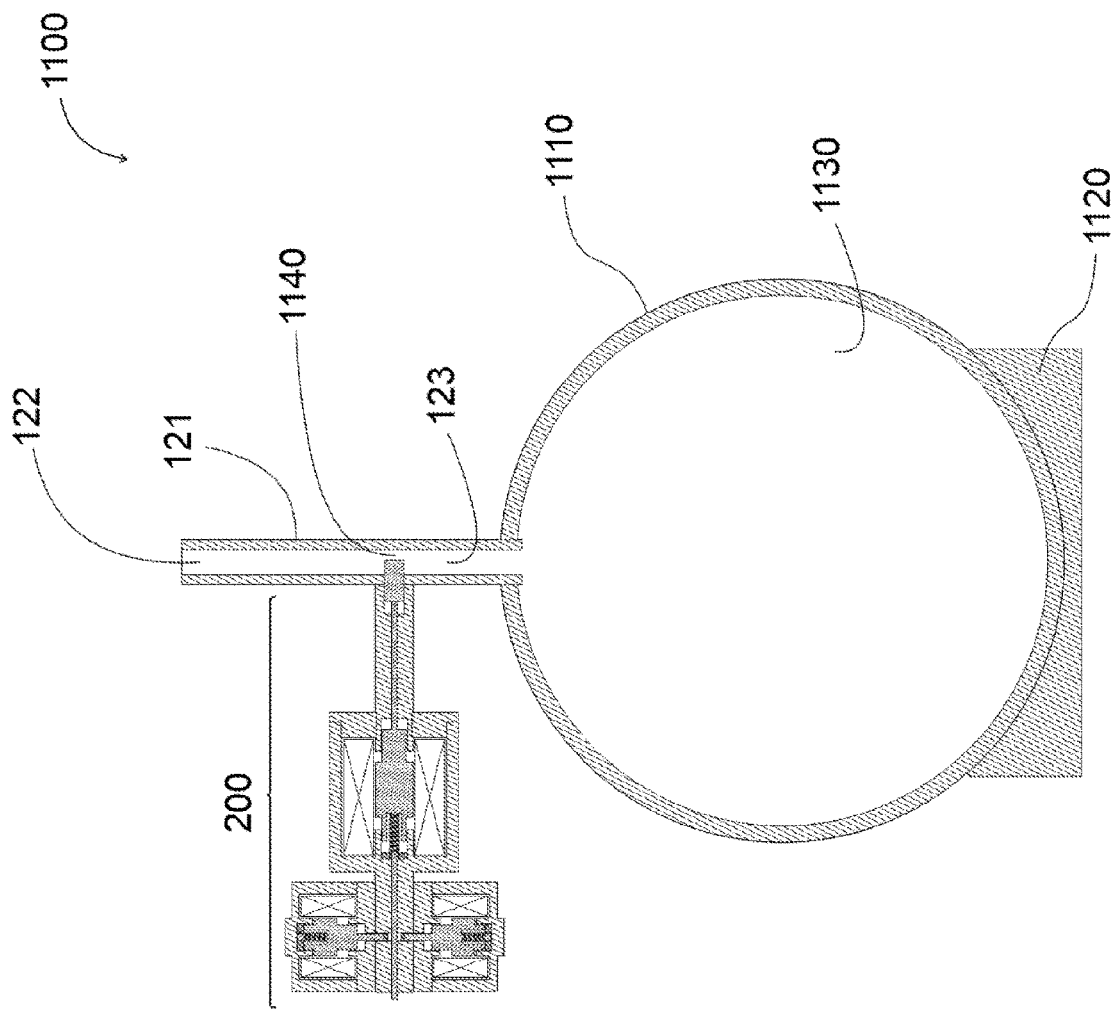
FIG. 11: Illustrates a whole air sampling cannister including a proportional solenoid valve, according to an embodiment.

FIG. 11 describes an air sampling cannister 1100 suitable for use in EPA whole air sampling applications. In preparation for use the cannister 1110 is evacuated and the resulting vacuum is employed to collect the sample of air. Cannister 1110 defines an internal region 1130. The volume of the internal region 1130 generally ranges from about 50 milliliters to about 25 liters depending on the test requirements. Airflow via an air inlet 122 is regulated by a proportional valve 200. In the example of FIG. 11 the proportional valve 200 may be as described in the description of FIG. 2 above. The vacuum may be maintained with the proportional valve 200 in the closed position. Additional shutoff valves (not shown) may be employed to ensure long term storage of the evacuated and filled sample cannisters. The sampling cannister 1100 may be made from any inert material, most commonly stainless steel, glass, aluminum, or chemically treated or coated versions of the same.

The cannister is placed on a support 1120 in the desired location, often in a remote outdoors locale where there are no available electrical utilities. An orifice 1140 of the proportional valve 1100 begins to open sufficient to create the desired flow rate into the cannister. During periods where the proportional valve 200 is held in an intermediate position, the friction force is applied.

As the cannister 1100 fills with sample, the vacuum pressure decreases. In order to maintain the same flow rate through fluid flow tube 121, the orifice 1140 of the proportional valve 200 must gradually open to counter the steadily decreasing vacuum pressure. When the proportional valve is increasing the size of the orifice 1140, there is little or no friction force applied. When the sampling phase is complete the proportional valve 200 is closed. An operator may additionally close any additional shutoff valves and collect the cannister 1100.

Control of the proportional valve 200, including timed open-close sequences, may be achieved through various microprocessor-control approaches. In some embodiments, the power supplied to the microprocessor and valve components may be from a battery or other energy storage device.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A proportional solenoid, capable of linear motion, comprising:
   an electromagnetic valve device including
      a solenoid assembly having a mobile core,
      a push rod connecting the mobile core to a valve plunger, and
      a device operable to apply a controlled friction force to hold the mobile core in an intermediate position, wherein the friction force is greater than motive forces generated by the solenoid assembly,
   wherein the intermediate position may be any position between completely open and completely closed as set via proportional current, the proportional current being a magnitude of current proportional to a distance for the mobile core to reach the intermediate position.

2. The solenoid arrangement in claim 1, wherein the friction force is maintained with zero electric current.

3. The solenoid arrangement in claim 1, where the friction force is disposed onto at least one contact region of the axial surface of a solenoid rod, the mobile core, the push rod, the valve plunger, or a combination thereof of the solenoid assembly.

4. The solenoid arrangement in claim 3, wherein the friction force is provided by at least one second solenoid.

5. The solenoid arrangement in claim 4, wherein the at least one second solenoid includes a second solenoid mobile portion having a second solenoid mobile core, a second solenoid rod, and a second push rod; and
   wherein the second solenoid mobile portion is configured to apply the friction force to the axial surface of the solenoid rod, the mobile core, the push rod, or the valve plunger of the proportional solenoid.

6. The solenoid arrangement in claim 5, wherein the second solenoid push rod further comprises a push rod grip;
wherein the push rod grip includes an elastomeric material; and
wherein the push rod grip is configured to contact the solenoid rod, the mobile core, the push rod, or the valve plunger of the proportional solenoid during application of the friction force.

7. The solenoid arrangement in claim 5, wherein at least a portion of the friction force is applied tangentially to the at least one contact region.

8. The solenoid arrangement in claim 5, wherein at least a portion of the friction force is applied normal to the at least one contact region.

9. The solenoid arrangement in claim 3, wherein the device is operable to apply the friction force coaxial around the radial surface of the contact region.

10. The solenoid arrangement in claim 9, where the coaxial friction force is provided by a reversibly deformable ferrule.

11. The solenoid arrangement in claim 9, where the coaxial friction force is provided by a reversibly deformable O-ring.

12. The solenoid arrangement in claim 9, where the coaxial friction force is provided by a wire coil.

13. The solenoid arrangement in claim 3, where the friction force is provided by a rotating cam.

14. The solenoid arrangement in claim 1 wherein the solenoid assembly includes
a yoke,
an electromagnetic coil disposed in said yoke, and
the mobile core slidably received in said electromagnetic coil relative to a solenoid stroke length,
wherein magnetic field forces created by the electromagnetic coil contribute to motive forces to position the mobile core,
a spring, wherein compression spring forces contribute to the motive forces to position the mobile core, and
a latching magnet.

15. A cannister comprising:
a container having an internal region;
wherein the pressure in the internal region is different from atmospheric pressure; and
the proportional solenoid of claim 1;
wherein the proportional solenoid is configured to regulate a gas flow between the internal region and the atmosphere.

16. The cannister of claim 15, wherein the pressure in the internal region is less than atmospheric pressure.

17. A method for holding a proportional solenoid valve actuator in an intermediate state by creating a controlled friction force comprising:
energizing a solenoid valve electromagnetic coil, wherein the electromagnetic coil is configured to apply a motive force to a mobile solenoid core;
positioning the mobile solenoid core to a desired intermediate position in contact with the proportional solenoid valve actuator via proportional current to the electromagnetic coil, the proportional current being a magnitude of current proportional to a distance for the mobile solenoid core to reach the intermediate position;
applying a friction force to the mobile solenoid core at the desired position sufficient to prevent movement of the mobile solenoid core away from the desired position; and
deenergizing the solenoid valve electromagnetic coil after the friction force has been applied,
wherein the intermediate position may be any position between completely open and completely closed.

18. A method for holding a proportional solenoid valve actuator in an intermediate state by creating a controlled friction force comprising:
energizing a first solenoid valve electromagnetic coil of a first solenoid valve, wherein the first electromagnetic coil is configured to apply a motive force to a first mobile solenoid core;
positioning the first mobile solenoid core to a desired intermediate position in contact with the proportional solenoid valve actuator via proportional current to the first electromagnetic coil, the proportional current being a magnitude of current proportional to a distance for the mobile solenoid core to reach the intermediate position;
applying a current pulse to a second solenoid valve electromagnetic coil of a second solenoid, wherein the application of the current pulse to the second solenoid valve electromagnetic coil alters the contact state of the friction force; and
deenergizing the first solenoid valve electromagnetic coil,
wherein the intermediate position may be any position between completely open and completely closed.

* * * * *